A. HOBERECHT.
FEEDER AND DISTRIBUTER FOR ROLLER MILLS.
APPLICATION FILED JUNE 14, 1915.
1,203,000.
Patented Oct. 31, 1916.
2 SHEETS—SHEET 2.
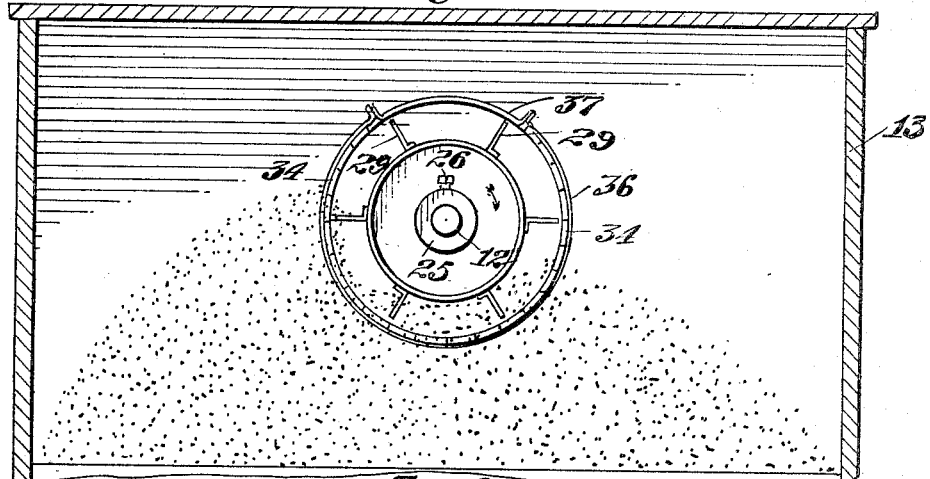
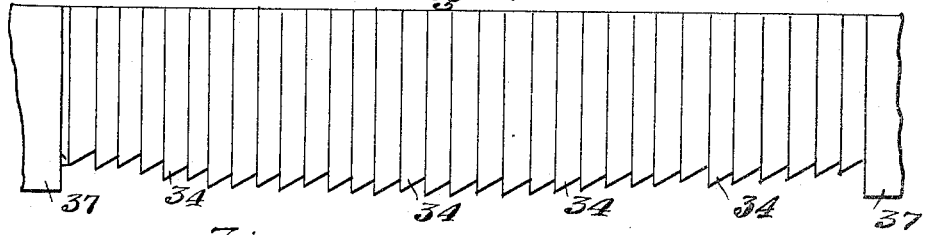
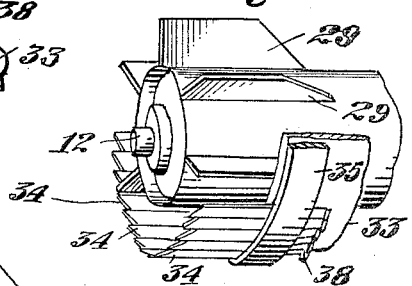
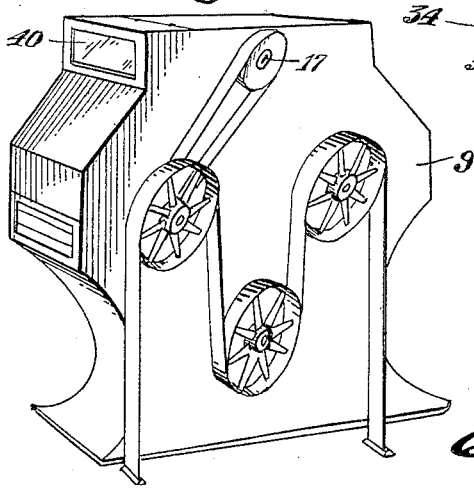
Inventor.
Albert Hoberecht.
by
Edmund A. Strauss
atty

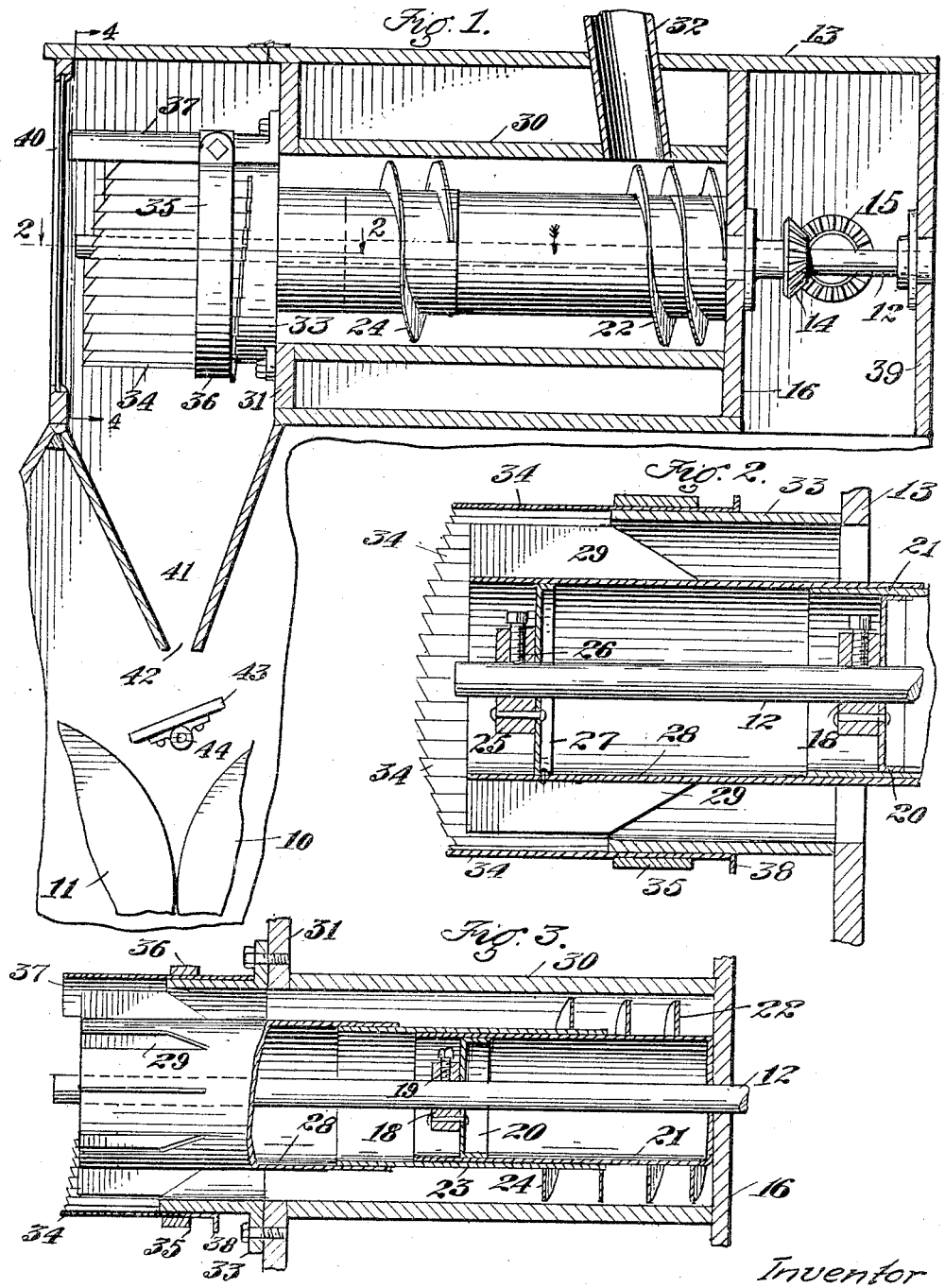

UNITED STATES PATENT OFFICE.

ALBERT HOBERECHT, OF LA ENSENADA, MEXICO.

FEEDER AND DISTRIBUTER FOR ROLLER-MILLS.

1,203,000.   Specification of Letters Patent.   Patented Oct. 31, 1916.

Application filed June 14, 1915. Serial No. 33,908.

*To all whom it may concern:*

Be it known that I, ALBERT HOBERECHT, a citizen of the United States, residing at La Ensenada, Lower California, Mexico, have invented new and useful Improvements in Feeders and Distributers for Roller-Mills for Grain-Milling Purposes, of which the following is a specification.

This invention relates to a mechanism for feeding and evenly distributing granular materials or stock to grinding rolls of roller mills.

In the usual methods of feeding stock to the grinding rolls of roller mills in which feed rolls with springs and gates or vibrating shakers or shoes are employed in connection with adjustable distributing means, the stock is caused to fall upon the rollers unevenly by reason of obstructions which block the fall of the stock at the discharge openings, such obstructions usually consisting of flour balls and foreign substances as sticks of chaff which are likely to be present in such stock. To overcome these disadvantages I have employed a distributing device which comprises a conveyer which feeds material to a distributer and thence to obstructer plates at the end of the latter, the distributer acting centrifugally.

It is an object of this invention to provide a distributing device having obstructer plates and a distributer of the centrifugal type above described with a conveyer which will prevent packing of the granular material.

It is another object of this invention to provide a distributing device with a conveyer which will feed the granular material to the centrifugal distributer member and the obstructer plates in a way such that the granular material has substantially no movement when it enters the centrifugal distributer member.

It is a further object of this invention to provide a centrifugal distributing device with adjustable obstructer plates and with an adjustable conveyer member so as to adapt it to granular materials of various characters.

It is a still further object to provide a centrifugal distributing device and with adjustable obstructer plates with a conveyer, the latter acting as a distributer to prevent the passage of stock when the distributing device is not in operation.

The invention is illustrated in the accompanying drawings, in which—

Figure 1 is a detail longitudinal section in side elevation of the feeder and distributer and obstructer plates showing the relation of the distributing device to the mill grinding rolls. Fig. 2 is an enlarged detail horizontal section on the line 2—2 of Fig. 1. Fig. 3 is a vertical longitudinal section of the distributer and obstructer plates with parts in elevation. Fig. 4 is a section in elevation on the line 4—4 of Fig. 1, illustrating the manner of distributing materials. Fig. 5 is a view in diagram illustrating the obstructers. Fig. 6 is a perspective detail illustrating the means of adjusting the obstructer plates. Fig. 7 is a detail in perspective showing the arrangement of the obstructer plates with relation to the centrifugal distributers. Fig. 8 is a perspective view of a roller mill showing the invention as applied.

More specifically, 9 designates a roller mill of any suitable construction which is fitted with two pairs of milling rollers 10 and 11 arranged to be rotated in the usual manner common in roller mills. The important feature of my present invention resides in the mechanism for distributing the stock to the grinding rollers and which is completely shown in Fig. 1. The distributing mechanism shown in Fig. 1 is employed for feeding stock to one pair of milling rollers. A duplicate of the parts shown in Fig. 1 is used for distributing stock to the other pair of milling rollers.

The feeder and distributer embodies a main shaft 12 suitably supported in bearings and extends horizontally through a housing 13. The main shaft 12 is provided with a bevel gear 14 which meshes with a bevel gear 15 disposed adjacent a partition 16. Bevel gear 15 is mounted on a drive shaft 17 which is geared by a belt to the driving mechanism for the mill. A collar 18 is secured to shaft 12 by means of a set screw 19. Secured to collar 18 by any suitable means is a flanged disk 20 to which is fixedly attached a cylindrical member 21 having upon its surface a conveyer screw flight 22. Slidably mounted upon cylindrical member 21 is a cylindrical member 23 provided with a conveyer screw flight 24. Cylindrical members 21 and 23 are thus arranged to telescope. A collar 25 is secured to the shaft 12 by means of a set screw 26. Secured to collar 25 is a flanged disk 27 to which is secured a cylindrical member 28 within which slides the cylindrical member 23. Upon the surface of cylindrical member 28 are disposed radial blades 29 which act centrifugally in distributing the stock. It will be noted that by means of this construction of conveyer and distributing member that flight 24 may be adjustably positioned between flight 22 and the distributer blade.

The housing 13 has a cylindrical casing 30 surrounding the conveyer portion of the distributer. The casing 30 is disposed between partitions 16 and 31. Conveyer pipe 32 is connected into the casing 30 and is adapted to serve as a feed for the conveyer. A flanged tubular member 33 is secured by bolts or any other well known means to the partition 31 and encompasses the distributer. Mounted upon the tubular member 33 are obstructer plates 34 which are secured to the tubular member by a ring 35. The ring 35 is segmental and is comprised of two portions 36 and 37. The upper portion 37 comprises a plate or shield and extends over the distributer member at the top instead of the obstructer plates. The ends of the ring portion 36 are upturned and provided with apertures. The shield 37 has ears provided with apertures adapted to register with the apertures in the member 36. Bolts are passed through the apertures and serve to secure the ring portions 36 and 37 together.

It will be noted that the obstructer plates 34 extend around a portion of the periphery of the distributer member, while the upper portion is completed by the shield 37. The rear ends of the obstructer plates 34 are bent upwardly to form a projection 38 which serves in manually adjusting the position of the obstructer plates. The outer ends of plates 34 are cut diagonally to form V-shaped spaces between the ends of the plates through which the stock is discharged on rotation of the distributer.

The housing 13 is closed by end walls 39 and 40. A hopper 41 is disposed immediately below the distributer and has an opening 42 through which the stock passes and drops upon a cant board 43. The cant board 43 is fixedly secured to a rock shaft 44 so that the cant board may be adjusted to any desired inclination with respect to the rolls 10 or 11.

In the operation of the invention, material to be fed to the grinding rolls is delivered to the conveyer member through pipe 32. The shaft 17 is then rotated causing rotation of the shaft 12 and rotation of the distributing device. The conveyer flight 22 forces the stock along the casing 30 to conveyer flight 24 which in turn moves the stock to the distributing blades 29, where it is thrown centrifugally outward against the obstructer plates 34 and discharged through the V shaped spaces formed at the ends thereof into the hopper 41 and from there upon the cant board 43 and then between the rolls 10 or 11. If the conveyer flight 24 is disposed close to conveyer flight 22 the stock may choke in the end of the casing 30.

The character of the stock as fineness or sharpness will be a factor in determining where the conveyer flight 24 should be positioned. With materials such as bran it is necessary to position the conveyer flight 24 nearer to the distributer blades, as the flight 22 will move the stock a certain distance whereupon the flight 24 moves it the remaining distance. With such materials as wheat the flow of stock is easier and flight 24 may be moved to a position close to flight 22. In making adjustment of the conveyer it is desirable that the granular material move upon the distributer in practically a dormant state, that is, it should have substantially no rotary movement.

It will be noted that conveyer flight 24 serves to stop the passage of stock when the mill is out of operation as it acts as an obstruction to the passage of material through casing 30. Obstructer plates 34 can be adjusted in relation to each other so that a uniform distribution of material may be obtained. This is effected by retracting or advancing individual obstructer plates thereby increasing or decreasing the amount of material discharged over the obstructer plates at that point. By proper adjustment the volume discharged throughout the length of the chute can be made such as to form an even stream falling upon the cant board.

What I claim is:

1. In a feeder and distributer for roller mills, the combination of a conveyer comprising a telescoping hub provided with impeller blades, and rotary means arranged at the discharge end of the conveyer for impelling materials transversely of the conveyer.

2. In a feeder and distributer for roller mills, the combination of a conveyer comprising a plurality of telescoping tubular members, each member provided with helical impeller blades, and rotary means arranged at the end of the conveyer for impelling materials transversely of the conveyer.

3. In a feeder and distributer for roller mills, the combination of a plurality of telescoping hub members, blades on one member to project materials transversely of said conveyer, and helical impeller blades on another hub member.

4. In a feeding and distributing device, a blade mounted to rotate, means for feeding the materials to be distributed to said blade, whereby the materials will be acted upon by the blade and impelled on a vertical plane, and means coöperating with said blade for evenly distributing the materials on a horizontal plane peripherally of the path of travel of said blade.

5. In a feeding and distributing device, a blade mounted to rotate, means for feeding materials to be distributed to said blade, and means encompassing the path of travel of the blade coöperating therewith having an outlet transverse thereof and to evenly distribute the materials acted on by the blade.

6. The combination of a rotary blade, a vertical wall adjacent the end of the blade, a curved wall encompassing the path of travel of said blade adapted to be adjusted in relation to the vertical wall to form a space between the end of the curved wall and the vertical wall adjacent the end of the blade, and means for feeding the materials to be distributed to said blade.

7. In a feeding and distributing device, the combination of a support, a series of obstructer plates arranged thereon in an arc of a circle, a plurality of revoluble blades adjacent the obstructer plates, and means for feeding materials to be distributed to said blades.

8. In a feeding and distributing device, the combination of a support, a series of obstructer plates thereon arranged parallel with each other on an arc of a circle, a blade mounted to rotate adjacent the obstructer plates, and means for feeding materials to be distributed to said blade.

9. In a feeding and distributing device, the combination of a support, a series of stationary obstructer plates thereon arranged in parallel relation to each other on an arc of a circle, a plurality of revolubly mounted blades arranged to travel adjacent the inner faces of the obstructer plates, and a conveyer for feeding materials to be distributed to said blades.

10. In a feeding and distributing device, the combination of a support, a series of obstructer plates thereon having convergent outer ends arranged on an arc of a circle and adapted to be adjusted in relation to each other, a series of rotary blades arranged adjacent said obstructer plates, and means for feeding materials to be distributed to said blades.

11. In a feeding and distributing device, the combination of a support, an annular member thereon, a demountable band encompassing said member, a plurality of obstructer plates interposed between said annular member and band and adapted to be adjusted to various positions, a shaft extending through the annular member, and blades carried by said shaft arranged to extend adjacent the obstructer plates.

12. In a feeding and distributing device, the combination of a support, an annular member thereon, a demountable band encompassing said member, a plurality of obstructer plates interposed between said annular member and band and adapted to be adjusted to various positions, a shaft extending through the annular member, blades carried by said shaft arranged to extend adjacent the obstructer plates, and means for delivering materials to be distributed to the blades.

13. In a feeding and distributing device, a series of stationary obstructer plates, a plurality of revolubly mounted blades adjacent the obstructer plates, and means for feeding materials to be distributer to said blades comprising revoluble conveyer blades.

14. In a feeder and distributer for roller mills, a series of stationary and adjustable obstructer plates, a series of rotary blades arranged adjacent the plates, a spiral conveyer for feeding materials to said blades, and means for rotating the conveyer and the blades.

15. In a feeding and distributing device, an annular member, a plurality of obstructer plates adjustably mounted on the outer periphery of said member, a shaft, a plurality of blades carried by said shaft arranged adjacent the obstructer plates, and means for feeding materials to be distributed through said annular member to said blades.

16. In a feeding and distributing device, an annular member, a plurality of obstructer plates adjustably mounted on the outer periphery of said member, a shaft, a plurality of blades carried by said shaft arranged adjacent the obstructer plates, and means for feeding materials to be distributed through said annular member to said blades comprising a series of curved plates carried by said shaft.

17. In a conveyer and distributer for roller mills, a stationary annular member, a plurality of obstructer plates adjustably mounted on said member, said plates having diagonally extending faces to form V-shaped spaces between the ends of the adjacent plates, a shaft extending through the annular member, a plurality of blades carried by said shaft extending adjacent the obstructer plates, and means for feeding the materials to be distributed through the annular member.

18. In a feeder and distributer, a horizontally extending shaft, distributing blades carried by said shaft extending parallel therewith, a series of annularly arranged obstructer plates disposed exteriorly of the path of travel of said blades, and means for delivering the materials to be distributed upon said obstructer plates to subject it to the centrifugal action of the blades.

In witness that I claim the foregoing I have hereunto subscribed my name this 1st day of June, 1915.

ALBERT HOBERECHT.

Copies of this patent may be obtained for five cents each, by addressing the "Commissioner of Patents, Washington, D. C."